UNITED STATES PATENT OFFICE 2,500,296

SYNTHESIS OF SUBSTITUTED PTERIDINES

Coy W. Waller and John H. Mowat, Pearl River, N. Y., assignors, by mesne assignments, to American Cyanamid Company, New York, N. Y., a corporation of Maine No Drawing. Application July 23, 1945, Serial No. 606,704

11 Claims. (Cl. 260—251)

This invention relates to organic compounds possessing biological activity and other useful properties and to processes of preparing the same.

We have discovered that new organic compounds may be prepared by the reaction of 2,4,5-triamino-6-hydroxypyrimidine, an alpha, beta-dihalo-propionaldehyde and aminobenzoic acid, and salts, esters, and amides thereof. The reaction may be illustrated by the following equation:

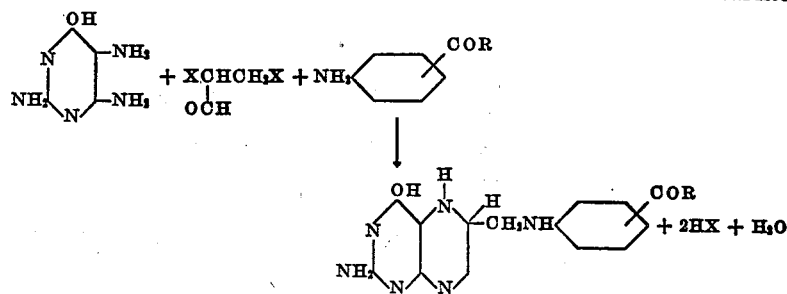

in which X is a halogen and R is —OH, —OR', or —NR"R''', R' being an alkyl radical and R" and R''' being hydrogen or aliphatic or aromatic radicals. Two hydrogen atoms of the pyrazyl ring of the illustrated product or one of its tautomeric or resonant forms, as the case may be, are removed, by oxidation or otherwise, to yield the following compounds:

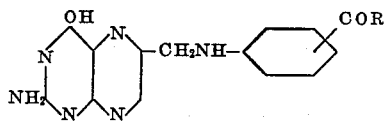

Acid salts of these compounds may be prepared by treatment with strong mineral acids, such as hydrochloric, sulfuric, and the like. Salts with cations may also be obtained by treatment of the compounds with a suitable alkali, such as an alkali metal hydroxide, ammonia, an amine, or the like. Other metal salts of cations such as zinc, silver, nickel, copper, magnesium, barium, and the like may be obtained therefrom by double decomposition methods, for example by treating a solution of an alkali metal salt of the compound with a soluble salt of the desired cation.

Generally speaking, the compounds of the present invention are yellow to reddish-brown crystalline solids, difficultly soluble in water and organic solvents. Some possess vitamin-like properties and appear to be necessary for, or stimulate the growth of, certain bacteria and higher forms of animal life. Some are also useful in stimulating haemoglobin formation and in the treatment of agranulocytosis. Some of the compounds of the invention appear to possess anti-vitamin properties and are useful for this reason. Other compounds in the series possess properties which make them of value in still other ways.

Of the reactants, 2,4,5-triamino-6-hydroxy-pyrimidine is a known compound and may be prepared by methods which have been described in the chemical literature. As is also well known, this compound may exist in one or more tautomeric forms, such as:

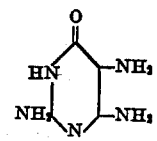

The latter is known as 2,4,5-triaminopyrimidone-6. Whether or not the compound exists in the keto form or the enol form probably depends upon the pH of the medium in which the compound is dissolved. In acid media the compound most likely exists in keto form whereas in alkaline media it exists as the enol form. As will be understood by those in the art, either of the tautomeric forms may be used in the same chemical reactions in like manner and reference hereinafter to the use of one tautomeric form includes the use of the others.

The preferred alpha, beta-dihalopropionaldehyde is alpha, beta-dibrompropionaldehyde, although, as illustrated in the specific examples, other dihalogenated propionaldehydes may be used. It will also be noted that acetals of dihalopropionaldehydes may also be used in the reaction. As an equilibrium exists between the free aldehyde and its acetal in solution, it is believed that the actual reactant is the aldehyde itself. Accordingly, when reference is made hereinafter, and in the claims, to the use of a dihalopropionaldehyde, such reference is intended to include the equivalent use of the corresponding dihalopropionaldehyde acetals.

The aminobenzoyl reactants include any ortho, meta, or paraaminobenzoic acid, and salts, esters, and amides and other related derivatives thereof. The biological activity of the resulting product depends, in large measure, upon the particular aminobenzoyl compound employed in the reaction. For example, when p-aminobenzoic acid or its salts are used, the resulting product is biologically active as an essential growth factor for *Streptococcus fecalis* R but is, however, inactive with certain other organisms for which other compounds of the invention show activity.

The compounds that are formed when using esters of p-aminobenzoic acid, such as the methyl, ethyl, butyl, benzyl, and the like, esters, do not appear to possess the same biological activity, being ineffective in promoting the growth of *Streptococcus fecalis* R and certain other organisms with which these compounds have been tested at the present time. It is possible, however, that these particular compounds may be of value in experimental medicine in other ways.

An important group of compounds prepared by the process of the present invention are those obtained when using as intermediates the amides of aminobenzoic acid. These intermediates include ortho, meta, and para-aminobenzamide and other aliphatic and aromatic amides which may be formed by the reaction of an aminobenzoic acid and aliphatic and aromatic amines, such as ethylamine, ethanolamine, dodecylamine, ethylhexyl amine, benzylamine, morpholine, aniline, and others such as mentioned hereinafter.

Of the various aminobenzoic acid amides that may be employed as intermediates, the most important appear to be those of amino acids, particularly of glutamic acid, as, for example, p-aminobenzoylglutamic acid and polypeptides thereof such as p-aminobenzoylglutamylglutamic acid, p-aminobenzoylglutamylglutamylglutamic acid and others having a plurality of peptide linkages made up of one or more of the various amino acids, such as p-aminobenzoylglutamylglycylglutamic acid. Compounds prepared with these intermediates have a wider range of biological activity and are the preferred products of the present invention. Of course, amides of p-aminobenzoic acid and other amino acids, such as glycine, aspartic acid, leucine, alanine, isovaline, cysteine, and the like, are also important intermediates of the present invention. The amino acids may be natural or synthetic and may be in any of the d, l, or dl forms. As these amino acid amides possess free carboxyl groups, it will be apparent that the salts and esters thereof may likewise be employed.

It will be understood, of course, that these amides may also be prepared by reacting a suitable amine with the derivative prepared with p-aminobenzoic acid, the aldehyde and the triamine.

The reaction may be conducted by mixing all of the three essential reactants together at the same time or the dihalopropionaldehyde may be first reacted with one of the other two reactants before adding the third to the reaction mixture.

As shown in the specific examples, the reaction may take place over a wide range of temperatures, from 2 or 3° C. up to 100° C. or higher. Likewise, the reaction will take place under a wide range of pH conditions, there appearing to be no limiting acidity or alkalinity. Best results appear to be obtained, however, within the range of pH 3 to pH 5.

The reaction is usually conducted with the reactants dissolved or suspended in a solvent such as water, ethyl alcohol, acetone, benzene, carbontetrachloride, chloroform, etc., or mixtures thereof.

As previously noted, the first product of the reaction appears to be an unstable dihydro form and, in the presence of oxidizing agents, two hydrogen atoms from the pyrazine nucleus are split out to form the aromatic form of the product. Simple exposure of the product to the air will bring about this oxidation in a short time. Other oxidizing agents, such as elemental iodine, will produce the same result and it may be of advantage to use such oxidizing agents under some conditions. The use of oxidizing agents of this type, however, is not a part of the present invention and forms the subject matter of an application by Donna B. Cosulich, Serial No. 791,462, filed December 12, 1947.

The invention will now be described in greater particularity by means of the following examples in which various reaction conditions and reactants are shown. It will be understood, of course, that the invention is not limited to the particular details of these examples since other reaction conditions and reactants within the skill of the art may be employed to produce new and useful compounds falling within the scope of the present invention. All parts are by weight unless otherwise indicated.

*Example 1*

A mixture of 1 part by weight of 2,4,5-triamino-6-hydroxypyrimidine, 2.06 parts by weight of alpha, beta-dibromopropionacetal, 0.58 part by weight of sodium acetate, and 24 parts by weight of ethyl alcohol was refluxed for 4 hours under an atmosphere of nitrogen. Another 0.58 part by weight of sodium acetate and 1.88 parts by weight of p-aminobenzoylglutamic acid, prepared from p-aminobenzoic acid and natural l(+) glutamic acid, was then added and the resulting mixture refluxed for 3 hours more under nitrogen. The mixture was cooled, diluted with 10 parts by weight of water, acidified with 3 parts by weight of concentrated hydrochloric acid, refluxed on a steam bath for 1 hour, cooled, and allowed to stand overnight at room temperature.

The resulting solution was filtered to remove insoluble material and heated to remove most of the alcohol. The product was precipitated at a pH between 3 and 5, collected, dissolved in an aqueous solution of sodium hydroxide, treated with activated charcoal, filtered, precipitated again at a pH of 3 to 5, washed with water, alcohol and ether, and then dried. The yield of crude product was 0.37 part by weight. Biological assay with *Lactobacillus casei* and *Streptococcus fecalis* R showed that the crude material contained a biologically active material, which was later proved to have the following structure:

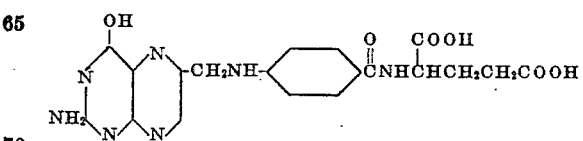

Naming this substance under the Ring Index system as a substituted glutamic acid, it would be called N-[4-{[(2-amino-4-hydroxy-6-pyrimido[4,5-b]pyrazyl)methyl]-amino}benzoyl]glutamic acid.

The purified product occurs as yellow crystals which have an index of refraction parallel to the length of the crystals of 1.559±0.003 and parallel to the width of the crystal of 1.744±0.003. The particular crystals examined had a thin lenticular form.

The product decomposes, when heated, without melting.

The free acid is readily dissolved in aqueous solutions of alkalis, with the formation of the corresponding salt. It is also soluble in aqueous solutions of strong acids but has a minimum solubility at a pH of about 3.

As will be apparent from the formula of the free acid it is possible to prepare mono-, di- and tri-basic salts by neutralization with a suitable alkali. The kind of salt depends upon the particular base chosen and also upon its strength and concentration.

Amides and esters of the product may be prepared by methods known to those skilled in the art.

The free acid was found to be effective in stimulating the growth of *Streptococcus fecalis R*, *Lactobacillus casei*, baby chicks and promoted the formation of haemoglobin.

Although it is not necessary that the product be highly purified for many of its important uses, one method of obtaining a highly purified material in crystalline form may be illustrated by the following general procedure. This process is not a part of the present invention but is included within the scope of an application filed June 11, 1946, Serial No. 669,099, by Brian L. Hutchings, now U. S. Patent 2,457,375, issued December 28, 1948. Other methods of purification, dependent upon the physical and chemical properties of the substance, may be devised. The crude reaction mixture, prepared as described above, is first dissolved in 0.2 N sodium hydroxide solution at a concentration equivalent to 400 micrograms ($\gamma$)/ml. Barium chloride is then added to 0.2 N and the mixture is stirred for ten minutes and filtered. Ethanol is added to the filtrate to a concentration of 20% and, after stirring, the solution is again filtered and the insoluble matter, if any, discarded. The excess barium in the filtrate is then precipitated by the addition of an equivalent amount of sulfuric acid, being careful to keep the mixture distinctly alkaline by the addition of sodium hydroxide, if necessary. After removal of the barium sulfate by filtration, the solution is diluted to 100 $\gamma$/ml. of the active compound and then adjusted to a pH of 7.0. The solution is again filtered and the filtrate is concentrated to a volume such that the active compound is present at a concentration of 200 $\gamma$/ml. This solution is extracted with four 10 volume portions of butanol which butanol extracts are discarded. The aqueous phase is then treated with an amount of activated charcoal equivalent to the total weight of the active compound present. The solution is filtered and charcoal discarded. The filtrate is then adjusted to a pH of 3.0 and heated to dissolve the active compound which may precipitate at this acidity. Additional water may be added, if necessary. The saturated solution is then allowed to cool to about 4° C. and the precipitated product is collected. It may be recrystallized by dissolving in hot water adjusted to a pH of 3, if desired.

*Example 2*

A mixture of 3 parts of alpha, beta-dibrompropionacetal and 3 parts of p-aminobenzoylglutamic acid was refluxed for 1 hour with 75 parts by volume of ethyl alcohol. 1.5 parts of 2,4,5-triamino-6-hydroxypyrimidine and 1.7 parts of sodium acetate in 75 parts by volume of ethyl alcohol were then added and the mixture refluxed for 4 hours. The mixture was then cooled, diluted with 30 parts of water, and then acidified with hydrochloric acid to a pH of less than 2, and heated at refluxing temperature on a steam bath for 1 hour. The reaction mixture was then cooled and allowed to stand overnight at room temperature.

The product was separated from solution by precipitation at a pH within the range 3 to 5 and then collected, redissolved, treated with activated charcoal, and reprecipitated, as in the preceding example. This procedure gave somewhat better yields of the same biologically active product described in Example 1.

*Example 3*

A mixture of 3 parts by weight of dibrompropionaldehyde and 7.4 parts of p-aminobenzoylglutamic acid was refluxed for 1 hour in 75 volumes of ethyl alcohol. 2.0 parts by weight of 2,4,5-triamino-6-hydroxypyrimidine and 2.3 parts of sodium acetate in 75 parts by volume of ethyl alcohol were then added and the mixture refluxed for 4 hours. The reaction mixture was cooled, diluted with water, refluxed for another hour, cooled, and allowed to stand.

The reaction mixture was filtered, treated to remove excess alcohol, and the product precipitated at a pH between 3 and 5. The crude product was redissolved in an aqueous solution of alkali, treated with activated charcoal, reprecipitated, filtered, and dried. The final product was found to be the same as that of Example 1.

*Example 4*

One part by weight of 2,4,5-triamino-6-hydroxypyrimidine was dissolved in 100 parts by volume of a hot 10% solution of sodium acetate. The solution was then filtered and cooled to room temperature. There was then added, simultaneously, 1.6 parts by weight of alpha, beta-dibrompropionaldehyde in 50 parts by volume of ethyl alcohol and 1.9 parts of p-aminobenzoylglutamic acid in 50 parts by volume of water. After 1 hour at room temperature the solution was filtered and the precipitated product was washed and dried. The crude material was found by biological assay with *Lactobacillus casei* and *Streptococcus fecalis R* to have an activity of 20% of that of the purified product of Example 1.

*Example 5*

The preceding example was repeated with the exception that the p-aminobenzoylglutamic acid was dissolved in the hot sodium acetate solution with the 2,4,5-triamino-6-hydroxypyrimidine instead of adding it later. The same biologically active product of Example 1 was obtained with yields a little lower than that of the preceding example.

*Example 6*

A series of tests were run using the procedure of Example 4 with the exception that the sodium acetate buffering agent was eliminated and the pH of the reaction mixture was adjusted by adding an acid or alkali, as needed. Tests were run, keeping the pH of the reaction mixture at 2, 3, 4, 5, 6, 7, 8 and 10. In all cases yields of the same product of Example 1 were obtained, the maximum yields being obtained at a pH of between 3 and 5, but substantial yields at both pH 2 and pH 10.

Example 7

One part by weight of 2,4,5-triamino-6-hydroxypyrimidine and 1.9 parts of p-aminobenzoylglutamic acid was dissolved in 100 parts by volume of water. The solution was filtered and cooled to room temperature. The solution was then adjusted to a pH of 4 and kept at this value during the remaining part of the reaction by the addition of acid or alkali as necessary. To the solution was added 1.6 parts of alpha, beta-dibromopropionaldehyde in 50 parts by volume of ethyl alcohol. After 1 hour at room temperature the solution was filtered and the precipitated product was washed and dried. Good yields of the biologically active product of Example 1 were obtained.

Example 8

The preceding example was repeated using acetone, benzene, carbontetrachloride and chloroform as solvents in place of ethanol for the alpha, beta-dibromopropionaldehyde. Yields of the product were about the same in all cases.

Example 9

Example 7 was repeated using 0.94 part by weight of alpha, beta-dichloropropionaldehyde in place of the alpha, beta-dibromopropionaldehyde. The biologically active product of Example 1 was obtained.

Example 10

Example 7 was repeated at temperatures 5°, 25°, 45°, and 70° C. In all cases the same product was obtained.

Example 11

Example 7 was repeated using in place of the p-aminobenzoylglutamic acid an equivalent amount of p-aminobenzoic acid. The product obtained had the following structure:

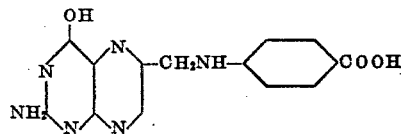

The product was obtained in the form of light yellow crystals. When examined microscopically the crystal phase presented gave only a centered optic axis figure with 2V nearly 90°. Beta ($\beta$) was found to be 1.720±0.005. The particular crystals examined were thin and diamond shaped and showed symmetrical extinction with some residual slight blue-gray transmission at the extinction position. The crystals decomposed, when heated, without melting.

The free acid is insoluble in aqueous solutions of strong acids and is extremely insoluble at a pH of about 3. It is soluble in aqueous solutions of bases with the formation of a monobasic or dibasic salt depending on the concentration and strength of base used.

The acid salts of the compound are obtained by treatment of the product with strong acids. The hydrochloride was prepared and had a refractive index parallel to the width of the crystals of 1.86±0.01 and a refractive index parallel to the length of the crystals of 1.459±0.003. The particular crystals examined were found to have a tiny columnar form, 10 to 20μ long and 1μ wide.

The compound of this example was found to be biologically different from the product of Example 1 as a growth factor, being an essential growth factor for *Streptococcus fecalis* R, but not for *Lactobacillus casei*. It also differed from the compound of Example 1 in that it did not promote the growth of chicks or the formation of haemoglobin.

Example 12

The procedure of Example 7 was repeated using in place of p-aminobenzoylglutamic acid an equivalent amount of ethyl p-aminobenzoate. The resulting compound had the following structure:

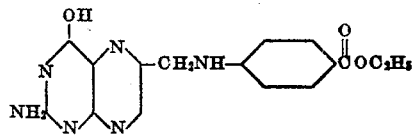

This compound was found to be less active than the product of Example 11 as a growth factor under the conditions of the test when tested against *Streptococcus fecalis* R.

Example 13

Example 7 was repeated using in place of p-aminobenzoylglutamic acid an equivalent weight of p-aminobenzamide. The resulting compound had the following structure:

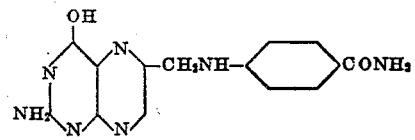

This compound was inactive as a growth factor when tested against *Streptococcus fecalis* R, *Lactobacillus casei*, and when fed to baby chicks.

Example 14

Example 7 was repeated using in place of p-aminobenzoylglutamic acid an equivalent weight of p-aminobenzoylglycine. The resulting compound had the following structure:

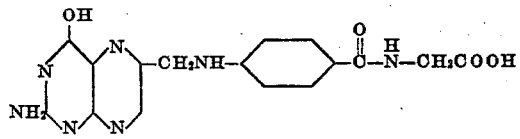

This compound was inactive in chickens in stimulating growth and promoting hemoglobin formation. When tested against *Streptococcus fecalis* R it was found to be active to some extent but when tested with *Lactobacillus casei* was found to have only a very slight activity therewith.

Example 15

To a mixture of 2.66 parts by weight of dl-aspartic acid, 15 parts of sodium bicarbonate, and 45 parts by volume of water was added 10.5 parts of p-nitrobenzoyl chloride during about 1½ hours with vigorous stirring. The filtered solution was then acidified with 16 parts by volume of concentrated hydrochloric acid. After cooling, the precipitated p-nitrobenzoic acid was filtered off and the filtrate was cooled in an icebox overnight. The precipitated p-nitrobenzoyl-dl-aspartic acid was collected, washed with water, dried, and then extracted with ether.

A solution of 2.65 parts by weight of p-nitrobenzoyl-dl-aspartic acid in 8 parts by volume of water and enough ammonium hydroxide to effect solution was added to a hot solution of ferrous sulfate heptahydrate (17.35 parts in 42 parts by volume of water) and the mixture was then treated with 16 parts by volume of 28% ammonium hydroxide in 5 portions during a period of about 15 minutes while heating and with vigorous stirring. The mixture was centrifuged to remove the precipitate of ferric hydroxide and the clear solution was then evaporated to a small volume and treated with 10 volumes of ethyl alcohol. The precipitate of ammonium sulfate was filtered off and the filtrate was evaporated to dryness in vacuo.

The residue was dissolved in a small volume of water and acidified with hydrochloric acid to a pH of 2 to 3. On cooling, the crude p-aminobenzoyl-dl-aspartic acid crystallized. The crystals were collected, washed with water, and then with acetone and ether to remove traces of p-aminobenzoic acid.

Example 7 was repeated using in place of p-aminobenzoylglutamic acid an equivalent weight of p-aminobenzoylaspartic acid. The resulting compound had the following structure:

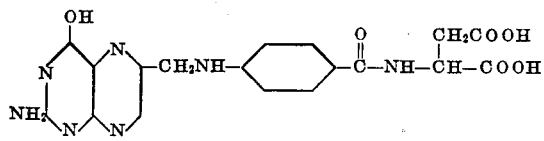

This compound is unusual in that it is antagonistic to the action of the compound of Example 1 as a growth promoting factor. Its action as an anti-vitamin in this respect may be of considerable value in experimental medicine. It is inactive as a growth promoting substance for *Streptococcus fecalis* R.

*Example 16*

A mixture of 5 parts by weight of p-nitrobenzoylglutamic acid and 15 parts by volume of acetic anhydride was heated at 100° C. for 5 minutes. The solution was then cooled, filtered, and evaporated to dryness in vacuo. The residue was then crystallized from chloroform and the crystalline product, p-nitrobenzoylglutamic anhydride, was then twice recrystallized from acetone and petroleum ether.

Glutamic acid was esterified in absolute alcohol containing dry hydrogen chloride by the procedure of Fisher (Ber. 34, 453 (1901)).

A solution of 2.68 parts of diethylglutamate in 10 parts by volume of dry chloroform was treated with 1.7 parts of p-nitrobenzoylglutamic anhydride. After standing at room temperature for ten hours the solution was extracted with dilute hydrochloric acid to remove excess diethylglutamate, and the chloroform solution was then evaporated to dryness in vacuo. The residue was dissolved in 32.5 parts by volume of 1. N sodium hydroxide solution, and, after 1 hour at room temperature, the calculated amount of 6 N hydrochloric acid was added. The solution was treated with charcoal, filtered, and evaporated to dryness. The residue was extremely hygroscopic and could not be crystallized but the barium salt was prepared, precipitated, and analyzed satisfactorily.

A solution of 0.5 part by weight of the crude p-nitrobenzoylglutamylglutamic acid in 1.5 parts by volume of water and 0.5 part by volume of ammonium hydroxide was added to a hot solution of 2.3 parts of ferrous sulfate heptahydrate in 6 parts by volume of water. Then 2.1 parts by volume of 28% ammonium hydroxide was added in several portions with heating and stirring. After separating the ferric hydroxide, the solution was evaporated to a small volume and treated with 10 volumes of ethyl alcohol. The precipitated ammonium sulfate was separated and the alcoholic filtrate was evaporated to dryness. The residue was taken up in 5 parts of water and acidified to a pH of 2 to 3 with hydrochloric acid and then evaporated to dryness in vacuo. The residue was then extracted with dry isopropanol and the isopropanol solution was again evaporated to dryness. The crude product contained 89.3% of p-aminobenzoylglutamylglutamic acid.

The p-aminobenzoylglutamylglutamic acid just described was condensed with 2,4,5-triamino-6-hydroxypyrimidine and alpha, beta-dibromopropionaldehyde by the procedure of Example 7. The resulting compound had the following structure:

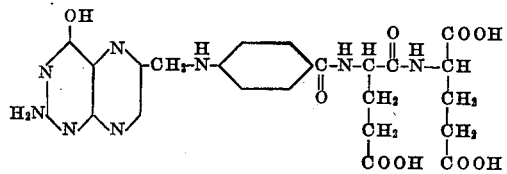

This product was also found to be a growth stimulating factor for *Lactobacillus casei* and *Streptococcus fecalis* R.

A related compound in which the peptide linkage has a different configuration is illustrated:

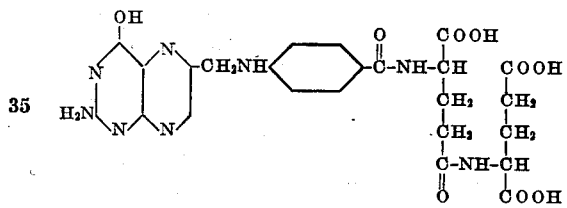

This compound is prepared using an appropriate p-aminobenzoylglutamylglutamic acid. This latter compound may be prepared by first reacting the anhydride of p-nitrobenzoylglutamic acid with an equivalent amount of an alcohol to form the alpha ester. An acid chloride is then obtained by reaction with phosphorus pentachloride. Reaction of the acid chloride with glutamic acid yields a polypeptide having the desired configuration. Hydrolysis of the alpha ester group and reduction of the nitro group yields the desired p-aminobenzoylglutamylglutamic acid starting material.

What we claim is:

1. The method which comprises bringing together under reactive conditions 2,4,5-triamino-6-hydroxy pyrimidine, a member of the group consisting of alpha, beta-dihalopropionaldehydes and acetals thereof and a member of the group consisting of aminobenzoic acids and salts, esters, and amides thereof, and after reaction thereof to produce a product having the general formula

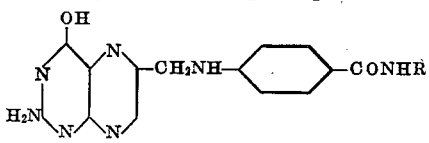

in which R is a member of the group consisting of hydrogen, aliphatic and aromatic radicals, recovering the said product.

2. The method which comprises bringing together under reactive conditions 2,4,5-triamino-6-hydroxy pyrimidine, a member of the group consisting of alpha, beta-dichloropropionaldehydes and acetals thereof and a member of the group consisting of aminobenzoic acids and salts, esters, and amides thereof, and after reaction thereof to produce a product having the general formula

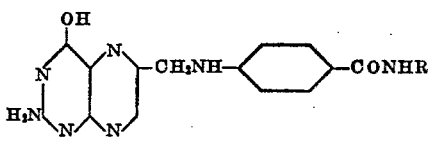

in which R is a member of the group consisting of hydrogen, aliphatic and aromatic radicals, recovering the said product.

3. The method which comprises bringing together under reactive conditions 2,4,5-triamino-6-hydroxy pyrimidine, alpha, beta-dibromopropionaldehyde and an amide of p-aminobenzoic acid, and after reaction thereof to produce a product having the general formula

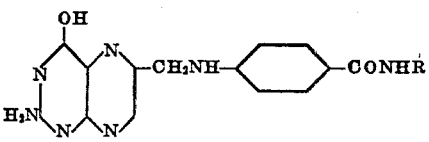

in which R is an aliphatic radical, recovering the said product.

4. The method which comprises bringing together under reactive conditions 2,4,5-triamino-6-hydroxy pyrimidine, alpha, beta-dibromopropionaldehyde and an amino acid amide of p-aminobenzoic acid, and after reaction thereof to produce a product having the general formula

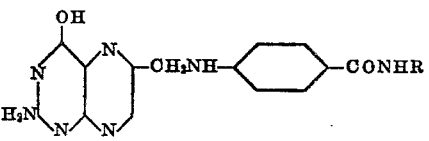

in which R is an aliphatic radical, recovering the said product.

5. The method which comprises bringing together under reactive conditions 2,4,5-triamino-6-hydroxy pyrimidine, alpha, beta-dichloropropionaldehyde and an amino acid amide of p-aminobenzoic acid, and after reaction thereof to produce a product having the general formula

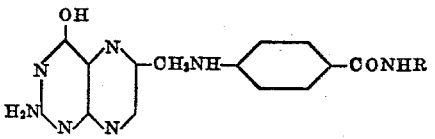

in which R is an aliphatic radical, recovering the said product.

6. The process of claim 4 in which the amino acid amide is p-aminobenzoyl-l(+)glutamic acid.

7. A process in accordance with claim 4 in which the amino acid has a peptide linkage.

8. The method which comprises bringing together in a solvent at a pH between about 3 and 5 and at a temperature between about 2° C. and 100° C. 2,4,5-triamino-6-hydroxy pyrimidine, alpha, beta-dibromopropionaldehyde and p-aminobenzoylglutamic acid, and after reaction thereof to produce a product having the formula

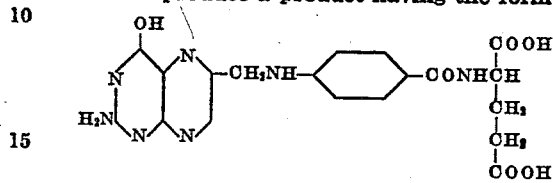

recovering the said product.

9. The method which comprises mixing together in an aqueous solution at a pH between about 3 and 5 and a temperature between about 2° C. and 100° C., 2,4,5-triamino-6-hydroxypyrimidine, alpha, beta-dibromopropionaldehyde and p-aminobenzoyl-l(+)-glutamic acid, and after reaction thereof recovering N-[4-{-[(2-amino-4-hydroxy-6-pyrimido[4,5-b] pyrazyl)-methyl]amino}benzoyl] glutamic acid from the reaction mixture.

10. The method which comprises mixing together in an aqueous solution at a pH between about 3 and 5 and a temperature between about 2° C. and 100° C., 2,4,5-triamino-6-hydroxypyrimidine, alpha, beta-dichloropropionaldehyde and p-aminobenzoyl-l(+)-glutamic acid, and after reaction thereof recovering N-[4-{-[(2-amino-4-hydroxy-6-pyrimido[4,5-b] pyrazyl)-methyl]-amino}benzoyl] glutamic acid from the reaction mixture.

11. The method which comprises mixing together in an aqueous solution at a pH between about 3 and 5 and a temperature between about 2° C. and 100° C., 2,4,5-triamino-6-hydroxypyrimidine, alpha, beta-dibromopropionaldehyde and p-aminobenzoyldiglutamylglutamic acid, and after reaction thereof recovering N-[4-{-[(2-amino-4-hydroxy-6-pyrimido [4,5-b] pyrazyl)-methyl] amino}benzoyl] diglutamylglutamic acid from the reaction mixture.

COY W. WALLER.
JOHN H. MOWAT.

REFERENCES CITED

The following references are of record in the file of this patent:

Chemical Abstracts, vol. 40, page 8378 (index).
Science, 102 (1945), page 227.
Annals of the New York Academy of Sciences, vol. XLVII pages 279–281.